United States Patent
Ohashi et al.

(10) Patent No.: US 12,223,072 B2
(45) Date of Patent: Feb. 11, 2025

(54) RIGHT-HOLDER TERMINAL, USER TERMINAL, AND CONTENT USAGE METHOD

(71) Applicant: Nippon Telegraph and Telephone Corporation, Tokyo (JP)

(72) Inventors: Shigenori Ohashi, Tokyo (JP); Shigeru Fujimura, Tokyo (JP); Atsushi Nakadaira, Tokyo (JP); Masayoshi Chikada, Tokyo (JP); Tatsuro Ishida, Tokyo (JP); Hiroki Watanabe, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 766 days.

(21) Appl. No.: 17/287,384

(22) PCT Filed: Oct. 23, 2019

(86) PCT No.: PCT/JP2019/041517
§ 371 (c)(1),
(2) Date: Apr. 21, 2021

(87) PCT Pub. No.: WO2020/085378
PCT Pub. Date: Apr. 30, 2020

(65) Prior Publication Data
US 2021/0397678 A1     Dec. 23, 2021

(30) Foreign Application Priority Data

Oct. 24, 2018 (JP) .................... 2018-200103

(51) Int. Cl.
*G06F 21/62*     (2013.01)
*G06F 16/27*     (2019.01)
*G06F 21/10*     (2013.01)

(52) U.S. Cl.
CPC .......... *G06F 21/6218* (2013.01); *G06F 16/27* (2019.01); *G06F 21/1015* (2023.08)

(58) Field of Classification Search
CPC ....... H04L 9/3239; H04L 9/3247; H04L 9/50; G06F 16/27; G06F 21/6218; G06F 21/10; G06F 21/64; G06F 21/31; G06F 21/1015
(Continued)

(56) References Cited

U.S. PATENT DOCUMENTS

| | | |
|---|---|---|
| 2018/0139056 A1 | 5/2018 | Imai et al. |
| 2018/0241551 A1 | 8/2018 | Fujimura et al. |
| 2019/0155997 A1* | 5/2019 | Vos ........................ G06F 21/105 |

FOREIGN PATENT DOCUMENTS

| | | |
|---|---|---|
| JP | 2006-127347 | 5/2006 |
| JP | 2017-50763 | 3/2017 |
| WO | WO 2017/038507 | 3/2017 |

OTHER PUBLICATIONS

Benet, "IPFS—Content Addressed, Versioned, P2P File System (DRAFT 3)," arXiv preprint arXiv:1407.3561, Jul. 2014, 11 pages.
(Continued)

*Primary Examiner* — Benjamin A Kaplan
(74) *Attorney, Agent, or Firm* — Fish & Richardson P.C.

(57) ABSTRACT

Content data is registered in a file management system, an identifier of a user in the file management system is registered in blockchain data, and a right-holder terminal includes a permission request receiving unit that receives, from the file management system, permission request data for the content including an identifier of the user, a verification unit that verifies that the identifier of the user registered in the blockchain data corresponds to the identifier of the user included in the permission request data, and an
(Continued)

permission issuing unit that transmits, to the file management system, permission data for permitting a use of the content by the user.

6 Claims, 8 Drawing Sheets

(58) Field of Classification Search
USPC .......................................................... 726/26
See application file for complete search history.

(56) References Cited

OTHER PUBLICATIONS

Ezawa et al., "A Study of Authentication System Using Blockchain," IEICE Technical Report, Jun. 2018, 118(109):47-54.
PCT International Search Report in International Appln. No. PCT/JP2019/041547, dated Dec. 19, 2019, 5 pages.

* cited by examiner

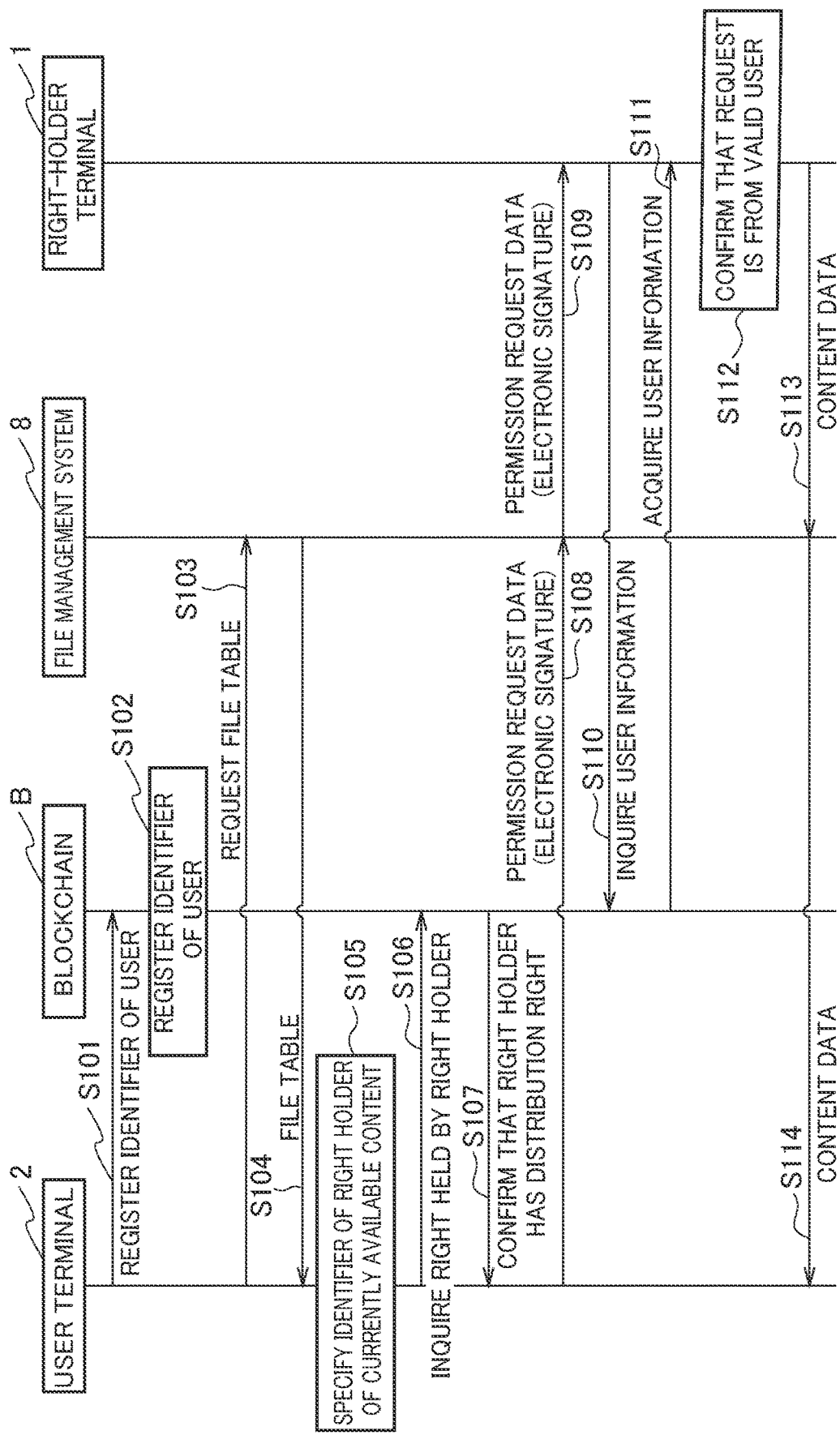

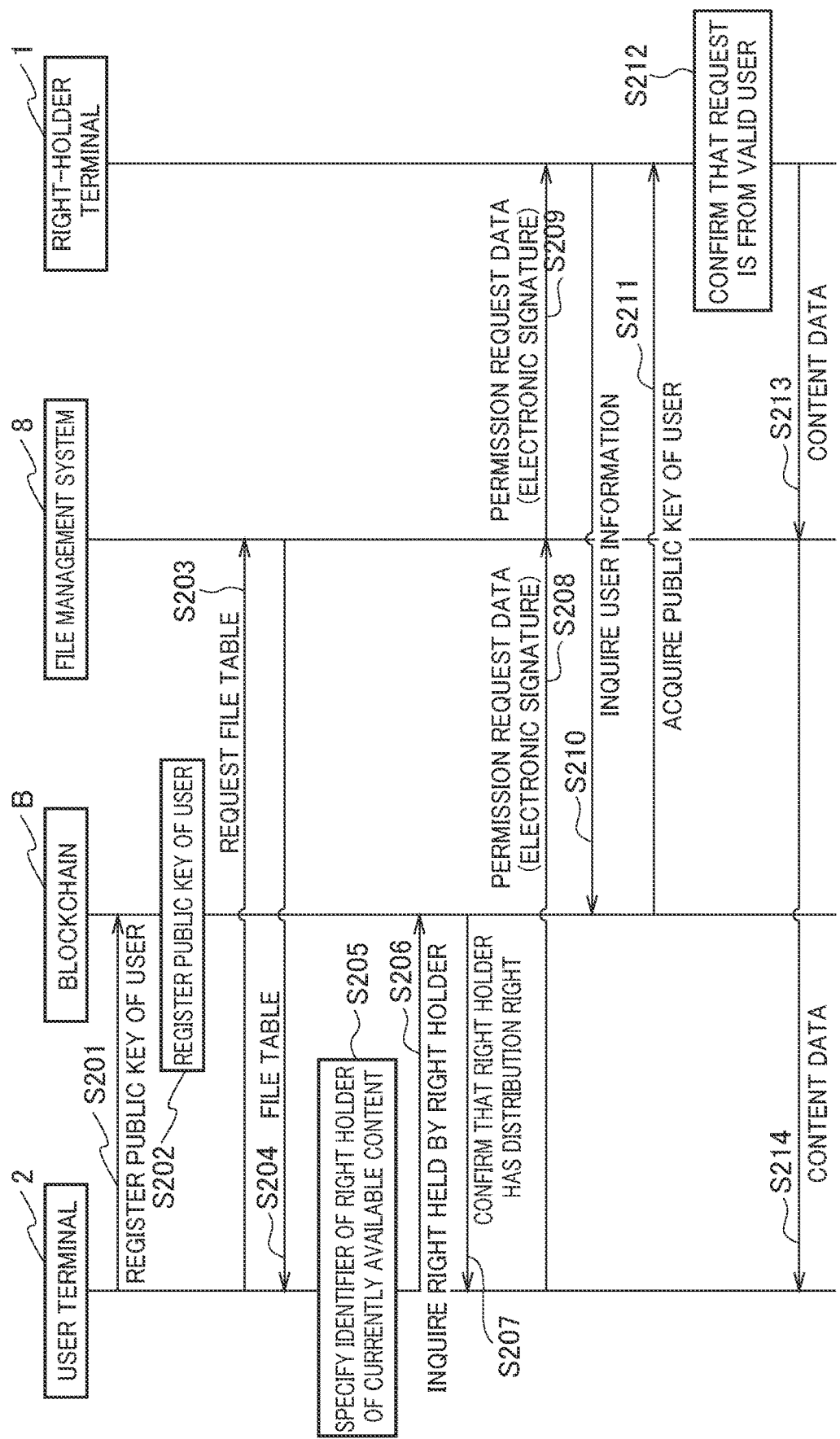

RIGHT-HOLDER TERMINAL, USER TERMINAL, AND CONTENT USAGE METHOD

CROSS-REFERENCE TO RELATED APPLICATIONS

This application is a National Stage application under 35 U.S.C. § 371 of International Application No. PCT/JP2019/041517, having an International Filing Date of Oct. 23, 2019, which claims priority to Japanese Application Serial No. 2018-200103, filed on Oct. 24, 2018. The disclosure of the prior application is considered part of the disclosure of this application, and is incorporated in its entirety into this application.

TECHNICAL FIELD

The present invention relates to a right-holder terminal that is used by a right holder of content and transmits permission data for the content to a user of the content, a user terminal that is used by the user of the content and transmits permission request data for the content to the right holder of the content, and a content usage method.

BACKGROUND ART

Examples of techniques to ensure by whom information is sent include an electronic signature. As a mechanism for realizing the electronic signature, an electronic signature based on a public key cryptosystem has become popular.

In transactions of digital cryptocurrencies, a blockchain which is a type of a decentralized distributed ledger is used. In the blockchain, pieces of information on transactions of cryptocurrencies communicated among participants are collected in units of blocks to form the blockchain. With respect to a structure of the blockchain, as the term chain implies, each block is recorded in a manner in which each block is linked to a previous block. Specifically, each block is linked by including a hash value of the previous block in the block.

If transaction information included in the block at a certain point in time is to be falsified, a hash value of the falsified block at a certain point in time is changed. This causes the necessity to falsify all blocks at and after the falsified block at a certain point in time. When a block is added, it is necessary to perform a very computationally intensive process (mining) of finding additional information (nonce) in which a hash value of a block matches a specific condition. From the coupling of the above factors, the blockchain has a mechanism that is extremely robust against the falsification.

Focusing on the fact that the mechanism is extremely robust against falsifications of the blockchain, there is a method of using the blockchain for the permission management of digital content (see Patent document 1). In Patent document 1, a user and a right holder transmit and receive, on the blockchain, permission information of content such as a decryption key for using the content.

Examples of file management systems that do not presume privileged nodes include IPFS (InterPlanetary File System) (see Non-Patent document 1). In IPFS, a file is divided into blocks of a specific size and is managed by terminals that belong to IPFS. A link of a relevant block is described in the block, and a tree-like graph is formed. The file is recognized by an identifier generated from a hash value, and the falsification of the file is not possible. In IPFS, the transparency and reliability can be ensured by its dispersibility and an ID structure.

PRIOR ART DOCUMENT

Patent Document

Patent document 1: Japanese Patent Application Publication No. 2017-050763

Non-Patent Document

Non-Patent document 1: Juan Banet, "IPFS-Content Addressed, Versioned, P2P File System (DRAFT 3)," [Online], [Retrieved on Oct. 15, 2018], Internet URL: https://ipfs.io/ipfs/QmR7GSQM93Cx5eAg6a6yRzNde1FQv7uL6X1o4k7zrJa3LX/ipfs.draft3.pdf

SUMMARY OF THE INVENTION

Problem to be Solved by the Invention

However, in a method disclosed in Patent document 1, the permission for the use of content is managed on the blockchain. In the method disclosed in Patent document 1, the distribution of the content itself is not cooperated with the blockchain, and is not managed on the blockchain. Therefore, in the method disclosed in Patent document 1, there is a case where the transparency and reliability of the distribution of the content is lacked.

It is also conceivable to adopt a method in which transactions of content itself are made on a distributed ledger such as a blockchain, but this is not appropriate method because such a method would be lead to a bloated blockchain ledger.

Further, although IPFS is suitable for retaining files, IPFS has problems of not being able to be applied to complicated application processes such as managing access to the files. As a result, if IPFS is used, a problem of the distribution of the file is caused regardless of the intention of a right holder.

Accordingly, an object of the present invention is to provide a right-holder terminal, a user terminal, and a content usage method capable of distributing content while ensuring the transparency and reliability of a right holder and a user.

Means for Solving the Problem

To solve the above described problems, a first feature of the present invention relates to a right-holder terminal that is used by a right holder of content and transmits permission data for the content to a user of the content. In the first feature of the present invention, data of the content is registered in a file management system, and an identifier of the user in the file management system is registered in a distributed ledger, and the right-holder terminal includes a permission request receiving unit that receives, from the file management system, permission request data for the content including the identifier of the user, a verification unit that verifies that the identifier of the user registered in the distributed ledger corresponds to the identifier of the user included in the permission request data, and a permission issuing unit that transmits, to the file management system, the permission data for permitting a use of the content by the user.

The right-holder terminal may further include an authentication request unit that transmits a connection request to the file management system and is connected to the file management system if the connection request is authenticated by the file management system.

A second feature of the present invention relates to a right-holder terminal that is used by a right holder of content and transmits permission data for the content to a user of the content. In the second feature of the present invention, data of the content is registered in the file management system, and the identifier of the user in the file management system is registered in the distributed ledger, and the right-holder terminal includes a permission request receiving unit that receives, from the file management system, permission request data for the content including an electronic signature of the user acquired by electronically signing based on an electronic signature method in which a public key of the user in the file management system can be restored, a verification unit that verifies that the identifier of the user corresponding to the public key of the user restored from the electronic signature corresponds to the identifier of the user registered in the distributed ledger, and a permission issuing unit that transmits, to the file management system, the permission data for permitting the use of the content by the user.

A third feature of the present invention relates to a right-holder terminal that is used by a right holder of content and transmits permission data for the content to a user of the content. According to the third aspect of the present invention, data of the content is registered in the file management system and the public key of the user in the file management system is registered in a distributed ledger, and the right-holder terminal includes a permission request receiving unit that receives, from the file management system, permission request data for the content including an electronic signature of the user, a verification unit that verifies that a public key of the user registered in the distributed ledger corresponds to the electronic signature, and a permission issuing unit that transmits, to the file management system, the permission data for permitting the use of the content by the user.

A fourth feature of the present invention relates to a right-holder terminal that is used by a right holder of content and transmits permission data for the content to a user of the content. According to the fourth aspect of the present invention, data of the content and the public key corresponding to the identifier of the user are registered in the file management system, and an identifier of the user in the file management system is registered in the distributed ledger, and the right-holder terminal includes a permission request receiving unit that receives, from the file management system, permission request data for the content including the identifier of the user and an electronic signature of the user, a verification unit that acquires, from the file management system, a public key corresponding to the identifier of the user included in the permission request data, and verifies that the acquired public key corresponds to the electronic signature, and that the identifier of the user included in the permission request data corresponds to the identifier of the user registered in the distributed ledger, and a permission issuing unit that transmits, to the file management system, the permission data for permitting the use of the content by the user.

A fifth feature of the present invention relates to a user terminal that is used by a user of content and transmits permission request data for the content to a right holder of the content. According to the fifth feature of the present invention, data of the content is registered in a file management system, and the user terminal includes a registration unit that registers, in a distributed ledger, an identifier of the user in a file management system, a permission request transmitting unit that transmits the permission request data for the content including the identifier of the user via the file management system, and a content usage unit that, if it is verified in a terminal of the right holder that the identifier of the user registered in the distributed ledger corresponds to the identifier of the user included in the permission request data, receives, from the file management system, permission data for permitting a use of the content by the user and uses the content.

The user terminal may further include an authentication request unit that transmits a connection request to the file management system and is connected to the file management system if the connection request is authenticated by the file management system.

A sixth feature of the present invention relates to a user terminal that is used by a user of content and transmits permission request data for the content to a right holder of the content. According to the sixth feature of the present invention, data of the content is registered in a file management system, and the user terminal includes a registration unit that registers, in a distributed ledger, an identifier of the user in the file management system, a permission request transmitting unit that transmits the permission request data for the content including an electronic signature of the user acquired by electronically signing based on an electronic signature method in which a public key can be restored via the file management system, and a content usage unit that, if it is verified in a terminal of the right holder that the identifier of the user corresponding to the public key of the user restored from the electronic signature corresponds to the identifier of the user registered in the distributed ledger, receives, from the file management system, permission data for permitting a use of the content by the user, and uses the content.

A seventh feature of the present invention relates to a user terminal that is used by a user of content and transmits permission request data for the content to a right holder of the content. According to the seventh feature of the present invention, data of the content is registered in a file management system, and the user terminal includes a registration unit that registers, in a distributed ledger, a public key of the user in the file management system, a permission request transmitting unit that transmits the permission request data for the content including an electronic signature of the user via the file management system, and a content usage unit that, if it is verified in a terminal of the right holder that the public key of the user registered in the distributed ledger corresponds to the electronic signature, receives, from the file management system, permission data for permitting a use of the content by the user, and uses the content.

An eighth feature of the present invention relates to a user terminal that is used by a user of content and transmits permission request data for the content to a right holder of the content. In the eighth feature of the present invention, data of the content is registered in a file management system, and the user terminal includes a registration unit that registers, in a distributed ledger, an identifier of the user in the file management system and registers, in the file management system, the identifier of the user in the file management system and a public key in association with each other, a permission request transmitting unit that transmits the permission request data for the content including the identifier of the user and an electronic signature of the user via the file management system, and a content usage unit that receives, from the file management system, permission data for permitting a use of the content by the user and uses the content, if in a terminal of the right holder, the public key corresponding to the identifier of the user included in the permission request data is acquired from the file management system, and if it is verified that the acquired public key corresponds to the electronic signature, and that the identifier of the user included in the permission request data corresponds to the identifier of the user registered in the distributed ledger.

A ninth feature of the present invention is a right-holder program for causing a computer function as the right-holder terminal according to the first feature of the present invention.

A tenth feature of the present invention is a user program for causing a computer to function as the user terminal according to the second feature of the present invention.

A eleventh feature of the present invention relates to a content usage system including a right-holder terminal that is used by a right holder of content and transmits permission data for the content to a user of the content and a user terminal that is used by the user of the content and transmits permission request data for the content to the right holder of the content. According to the eleventh feature of the present invention, data of the content is registered in a file management system, and an identifier of the user in the file management system is registered in a distributed ledger. In the content usage system, the right-holder terminal includes a permission request receiving unit that receives, from the file management system, the permission request data for the content including the identifier of the user, a verification unit that verifies that the identifier of the user registered in the distributed ledger corresponds to the identifier of the user included in the permission request data, and a permission issuing unit that transmits, to the file management system, the permission data for permitting a use of the content by the user, and the user terminal includes a registration unit that registers, in the distributed ledger, the identifier of the user in the file management system, a permission request transmitting unit that transmits the permission request data for the content including the identifier of the user via the file management system, and a content usage unit that, if it is verified in the terminal of the right holder that the identifier of the user registered in the distributed ledger corresponds to the identifier of the user included in the permission request data, receives, from the file management system, the permission data for permitting the use of the content by the user and uses the content.

A twelfth feature of the present invention relates to a content usage method used for a content usage system including a right-holder terminal that is used by a right holder of content and transmits permission data for the content to a user of the content, and a user terminal that is used by the user of the content and transmits permission request data for the content to the right holder of the content. In the twelfth feature of the present invention, data of the content is registered in the file management system. The content usage method includes registering, by the user terminal, in a distributed ledger, an identifier of the user in a file management system, transmitting, by the user terminal, the permission request data for the content including the identifier of the user via the file management system, receiving, by the right-holder terminal, from the file management system, the permission request data for the content including the identifier of the user, verifying, by the right-holder terminal, that the identifier of the user registered in the distributed ledger corresponds to the identifier of the user included in the permission request data, transmitting, by the right-holder terminal, to the file management system, the permission data for permitting the use of the content by the user, and receiving, by the user terminal, the permission data from the file management system and using the content.

Effect of the Invention

According to the present invention, it is possible to provide a right-holder terminal, a user terminal, and a content usage method capable of distributing content while ensuring the transparency and reliability of a right holder and a user.

BRIEF DESCRIPTION OF THE DRAWINGS

FIG. 7 is a sequence diagram for explaining a content usage method according to a second modified example.

FIG. 8 is a sequence diagram for explaining a content usage method according to a third modified example.

MODE FOR CARRYING OUT THE INVENTION

Figure 1:
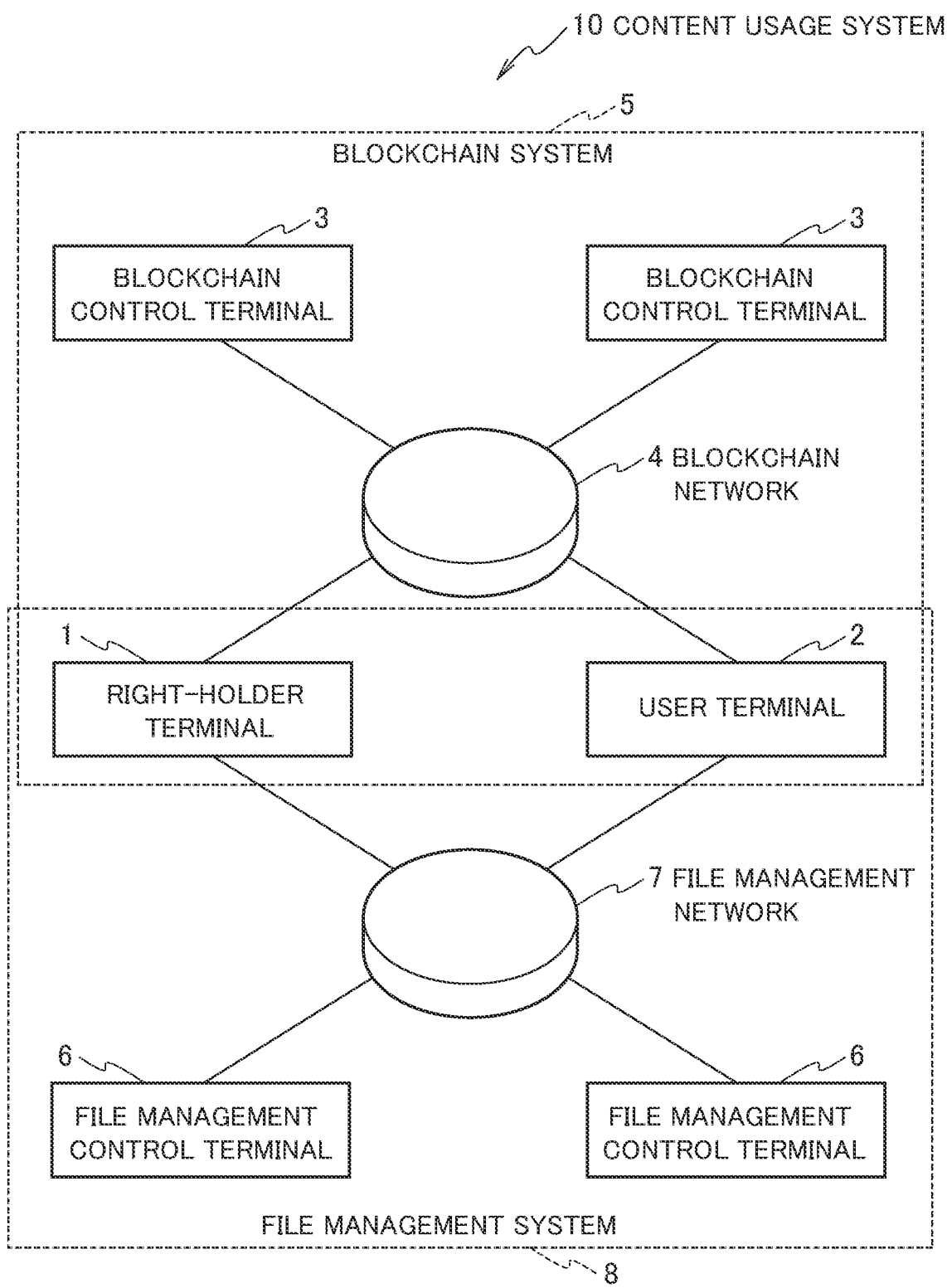
FIG. 1 is a diagram for explaining a configuration of a content usage system according to an embodiment of the present invention.

Next, an embodiment of the present invention will be described with reference to the drawings. In illustrations below of the drawings, the same or similar parts are denoted with the same or similar reference numerals.

(Content Usage System)

A content usage system 10 that includes and uses a right-holder terminal 1 and a user terminal 2 according to an embodiment of the present invention will be described. The content usage system 10 includes a blockchain system 5 and a file management system 8.

Figure 2:
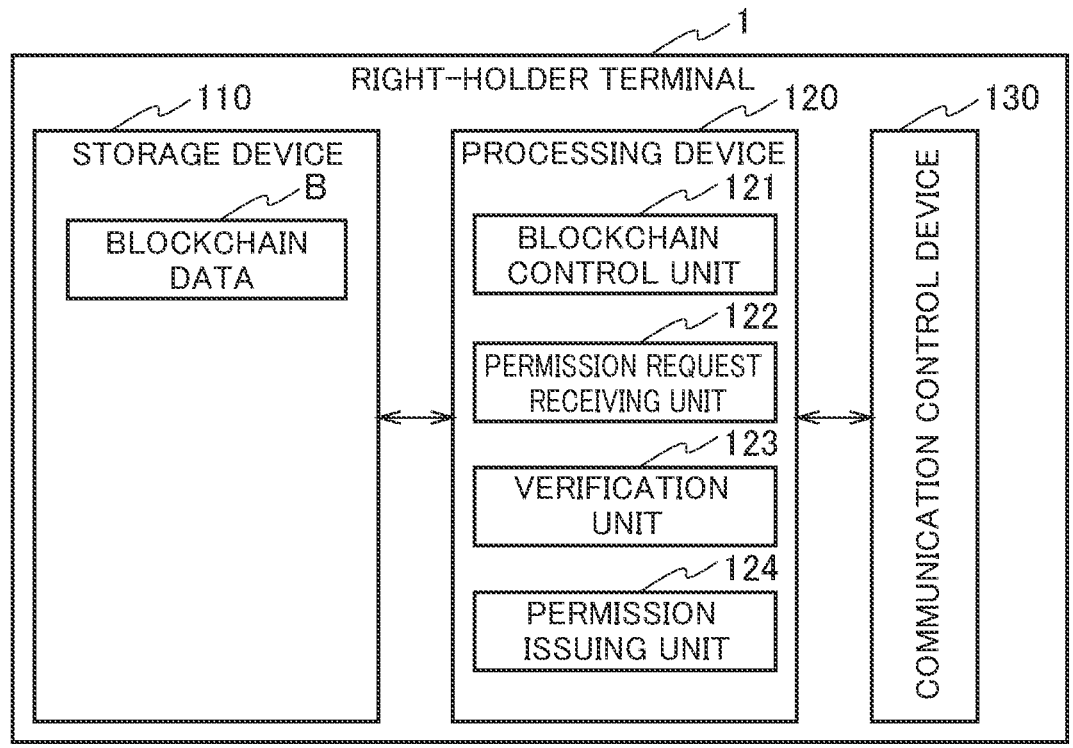
FIG. 2 is a diagram for explaining a hardware configuration and functional blocks of a right-holder terminal according to an embodiment of the present invention.
Figure 3:
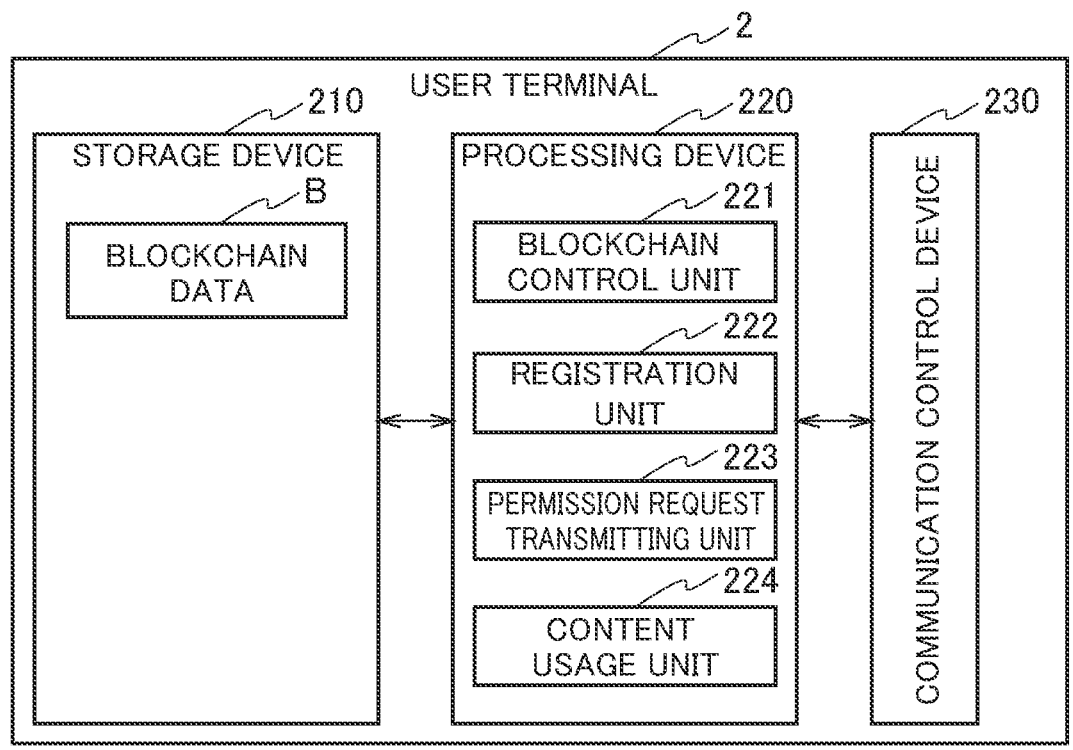
FIG. 3 is a diagram for explaining a hardware configuration and functional blocks of a user terminal according to an embodiment of the present invention.

In the blockchain system 5, blockchain data (a distributed ledger) is shared among terminals that belong to the system. The blockchain data is data in which blocks including transactions issued by terminals that belong to the blockchain system 5 are linked. The blockchain system 5 includes the right-holder terminal 1 and the user terminal 2. The blockchain system 5 may further include a plurality of blockchain control terminals 3. Each terminal that belongs to the blockchain system 5 makes P2P (Peer to Peer) connection through a blockchain network 4. As illustrated in FIGS. 2 and 3, each terminal that belongs to the blockchain system 5 includes blockchain data B and a blockchain control unit for synchronizing the blockchain data B.

The file management system 8 registers content data distributed in the content usage system 10. The file management system 8 includes the right-holder terminal 1 and the user terminal 2. The file management system 8 may further include a plurality of file management control terminals 6. The file management system 8 may be a centralized system in which a server (not illustrated) manages files, or alternatively may be a decentralized system without a server, in which terminals that belong to the file management system 8 are individually distributed and manage the files. If the file management system 8 is the centralized system, each terminal that belongs to the file management system 8 is connected to the server through a file management network 7. Alternatively, if the file management system 8 is the decentralized system, each terminal that belongs to the file management system 8 makes P2P connection through the file management network 7.

The right-holder terminal 1 is used by a right holder of the content and transmits permission data for the content to a user of the content. Alternatively, the user terminal 2 is used by the user of the content and transmits permission request data for the content to the right holder of the content. The blockchain control terminal 3 is used by users of the blockchain system 5 except for the right holder and the user of the content. The file management control terminal 6 is used by users of the file management system 8 except for the right holder and the user of the content.

In an example illustrated in FIG. 1, the number of blockchain control terminal 3 and the number of file management control terminal 6 are not limited. The blockchain control terminal 3 and the file management control terminal 6 may be different from each other. Alternatively, a single terminal may have functions of the blockchain control terminal 3 and the file management control terminal 6.

In an embodiment of the present invention, a case where an example of a distributed ledger is a blockchain, and information on the right holder and the user of content is transmitted and received via the blockchain is described, but the present invention is not limited to the case. For example, other distributed ledgers may be used instead of the blockchain to transmit and receive information on the right holder and the user of the content.

(Right-Holder Terminal)

The right-holder terminal 1 according to an embodiment of the present invention will be described with reference to FIG. 2. The right-holder terminal 1 is a general computer that includes a storage device 110, a processing device 120, and a communication control device 130. By the general computer executing a right-holder program, functions illustrated in FIG. 2 are realized.

The storage device 110 is a ROM (Read Only Memory), a RAM (Random Access Memory), a hard disk or the like, and stores various pieces of data such as input data, output data, and intermediate data that are required for the processing device 120 to perform processes. The processing device 120 is a CPU (Central Processing Unit) which reads and writes data stored in the storage device 110, and receives data from the communication control device 130 or outputs data to the communication control device 130 to perform processes in the right-holder terminal 1. The communication control device 130 is an interface through which the right-holder terminal 1 is communicably connected to terminals that belong to the blockchain network 4 or the file management network 7.

The storage device 110 stores the right-holder program, and also stores the blockchain data B.

The blockchain data B is data of the blockchain that is synchronized with each terminal of the blockchain system 5 illustrated in FIG. 1. The blockchain data B is updated by the blockchain control unit 121.

Although not illustrated in FIG. 2, the storage device 110 stores pieces of data necessary for the connection to the blockchain system 5 and the file management system 8. Specifically, the storage device 110 stores a secret key and a public key for an electronic signature of the right holder. In the blockchain system 5 and the file management system 8, different secret keys and public keys may be used, or alternatively, a common secret key and a common public key may be used.

The processing device 120 includes a blockchain control unit 121, a permission request receiving unit 122, a verification unit 123, and a permission issuing unit 124.

The blockchain control unit 121 causes the blockchain data B to be gently synchronized with blockchain data of another terminal and controls the blockchain data B so that the blockchain data B becomes data in the latest state nearly in real time. The blockchain is formed by connecting a plurality of blocks in a chain shape. If a plurality of transactions are generated, the blockchain is updated after verifying whether it is possible to add, to a current blockchain, a block in which the plurality of transactions are collected.

The permission request receiving unit 122 receives, from the file management system 8, the permission request data for the content including an identifier of a user. The permission request data also includes an identifier or the like of the content that the user desires for use.

The identifier of the user in the file management system 8 is registered in advance in the blockchain data B by the user, and a verification unit 123 verifies that the identifier of the user registered in the blockchain data B corresponds to the identifier of the user included in the permission request data. The verification unit 123 refers to the identifier of the user registered as a valid user of the content data in the blockchain data B, and verifies that the user who transmits the permission request data is the valid user.

After the verification unit 123 verifies that the identifier of the user registered in the blockchain data B corresponds to the identifier of the user included in the permission request data, the permission issuing unit 124 transmits, to the file management system 8, the permission data for permitting the use of the content by the user.

(User Terminal)

With reference to FIG. 3, the user terminal 2 according to an embodiment of the present invention will be described. The user terminal 2 is a general computer that includes a storage device 210, a processing device 220, and a communication control device 230. By the general computer executing the right-holder program, functions illustrated in FIG. 3 are realized.

The storage device 210 is a ROM (Read-Only Memory), a RAM (Random-Access Memory), a hard disk or the like, and stores various pieces of data such as input data, output data, and intermediate data that are required for the processing device 220 to perform processes. The processing device 220 is a CPU (Central Processing Unit) which reads and writes data stored in the storage device 210 and receives data from the communication control device 230 or outputs data to the communication control device 230 to perform processes in the right-holder terminal 1. The communication control device 230 is an interface through which the user terminal 2 is communicably connected to terminals that belong to the blockchain network 4 or the file management network 7.

The storage device 210 stores a user program and also stores blockchain data B.

The blockchain data B is similar to the blockchain data B described with reference to FIG. 2.

Although not illustrated in FIG. 3, the storage device 210 stores pieces of data necessary for the connection to the blockchain system 5 and the file management system 8. Specifically, the storage device 210 stores a secret key and a public key for an electronic signature of the user. In the blockchain system 5 and the file management system 8, different secret keys and public keys may be used, or alternatively, a common secret key and a common public key may be used.

The processing device 220 includes a blockchain control unit 221, a registration unit 222, a permission request transmitting unit 223, and a content usage unit 224.

The blockchain control unit 221 functions in the similar manner as the blockchain control unit 121 described with reference to FIG. 2.

The registration unit 222 registers the identifier of the user in the file management system 8 in the blockchain data B. The registration unit 222 associates the identifier of the content to be used with the identifier of the user in the file management system 8 as information on the valid user of the content, and registers the associated identifier in the blockchain data B. The registration unit 222 issues a transaction for registering, in blockchain data B, the identifier of the user in the file management system 8, and broadcasts the issued transaction to the blockchain network 4. The broadcasted transactions are verified by terminals that belong to the blockchain network 4 such as the blockchain control terminal 3, are collected into a new block, and are included in the blockchain data B.

The permission request transmitting unit 223 transmits the permission request data for the content including the identifier of the user via the file management system 8. The permission request data also includes an identifier or the like of the content that the user desires to use.

The content usage unit 224 receives, from the file management system 8, the permission data for permitting the use of the content by the user, and then, uses the content. After it is verified in the right-holder terminal 1 that the identifier of the user registered in the blockchain data B corresponds to the identifier of the user included in the permission request data, the right-holder terminal 1 transmits the permission data to the file management system 8. The file management system 8 provides content to the user terminal 2 in accordance with the permission data transmitted from the right-holder terminal 1.

(Content Usage Method)

A content usage method according to an embodiment of the present invention will be described with reference to FIG. 4. In an example illustrated in FIG. 4, a case is described in which the file management system 8 is a distributed file management system and the right-holder terminal 1 stores the content data. Further, in the example illustrated in FIG. 4, it is assumed that, to the blockchain data B, the identifier of the right holder of the right-holder terminal 1 is registered in advance as a valid right holder who has right to distribute the content data.

Figure 4:
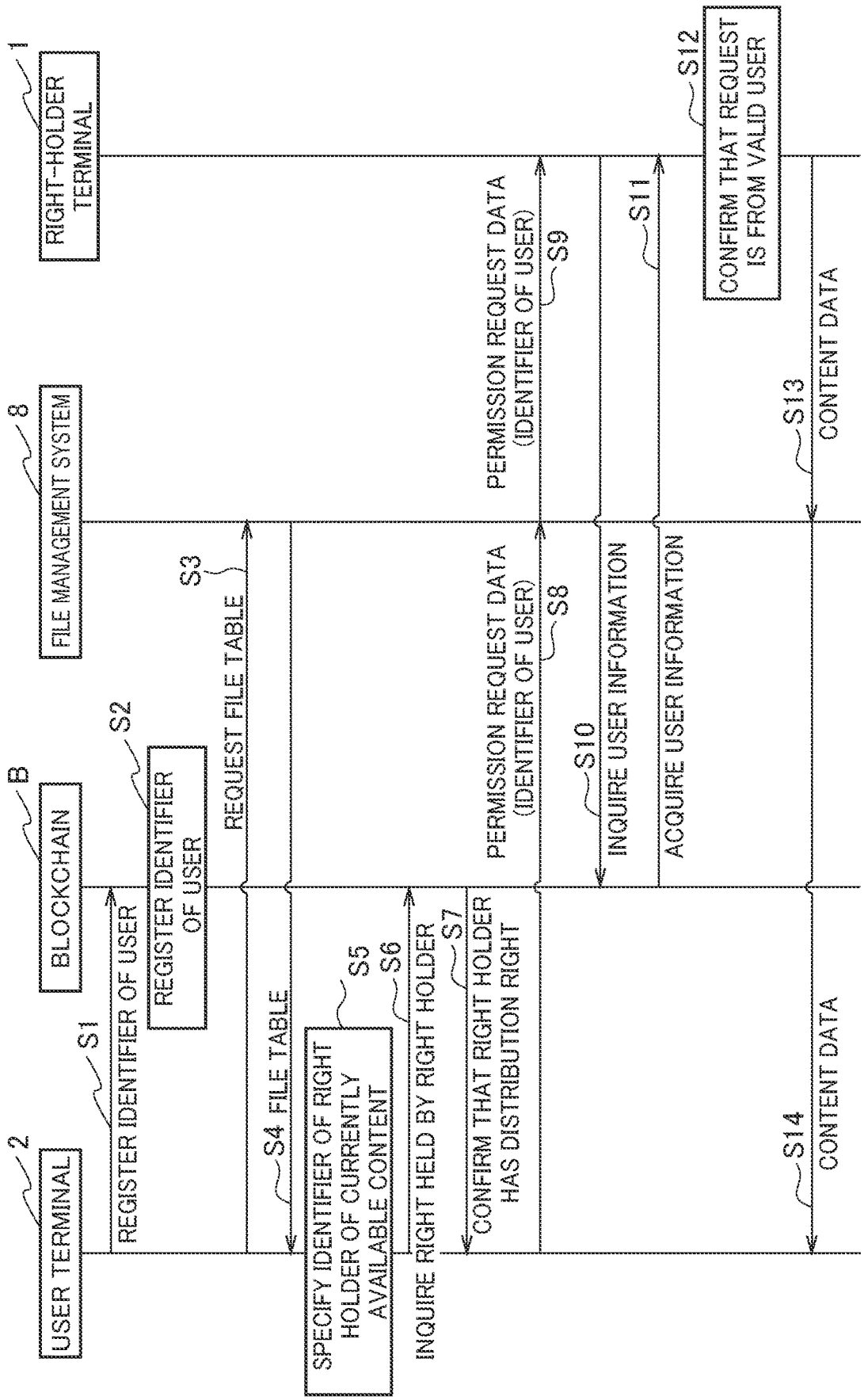
FIG. 4 is a sequence diagram for explaining a content usage method according to an embodiment of the present invention.

The processes of the blockchain data B illustrated in FIG. 4 are processes to be performed by terminals that belong to the blockchain system 5. Similarly, if the file management system 8 includes a server, the processes of the file management system 8 are processes to be performed by the server, and alternatively, if the file management system 8 does not include a server, the processes of the file management system 8 are processes to be performed by terminals that belong to the file management system 8.

First, in step S1, the user terminal 2 transmits, to the blockchain network 4, a transaction for registering, in the blockchain data B, the identifier of the user in the file management system 8. The transaction is verified by terminals that belong to the blockchain system 5 and is included in the blockchain data B. At this time, in step S2, the identifier of the user included in the transaction is included in the blockchain data B. The blockchain data B including the identifier of the user is synchronized among terminals that belong to the blockchain system 5.

In step S3, the user terminal 2 requests a file table to the file management system 8, and acquires the file table in step S4. The file table includes information on the right holder of the content data that is managed in the file management system 8. In step S5, the user terminal 2 specifies, from the file table acquired in step S4, the identifier in the file management system 8, the identifier being an identifier of the right holder of currently available content. At this time, the user terminal 2 also confirms that the right-holder terminal 1 is in an online state capable of distributing the content.

In step S6, the user terminal 2 refers to the blockchain data B, inquires about right that the right holder specified in step S5 holds for the content data, and confirms that the right holder has the right to distribute the content data in step S7. This enables the user to confirm that the right holder is a valid right holder concerning the distribution of the content.

In step S8, the user terminal 2 transmits the permission request data intended for the right-holder terminal 1 to the file management system 8. The permission request data includes the identifier of the user in the file management system 8. In step S9, the file management system 8 transmits the permission request data received from the user terminal 2 to the right-holder terminal 1.

After receiving the permission request data, in step 310, the right-holder terminal 1 inquires about information on the user who has transmitted the permission request data to the blockchain data B. In step S11, the right-holder terminal 1 acquires, from the blockchain data B, the identifier of the user as the information on the user.

In step S12, the right-holder terminal 1 confirms that the permission request data received in step S9 is transmitted from a valid user, and the permission request data is a request from the valid user. Specifically, the right-holder terminal 1 confirms that the user identifier in the file management system 8, which identifier is included in the permission request data, matches the user identifier in the file management system 8, which identifier is registered in the blockchain data B in the file management system 8. The right-holder terminal 1 may further refer to the blockchain data B to confirm that a predetermined amount of payment is made for the use of the content.

After confirming in step S12 that the permission request data is the request from the valid user, in step 313, the right-holder terminal 1 transmits the content data to the file management system 8. In step S14, the file management system 8 transmits the content data to the user terminal 2.

If the file management system 8 is a centralized system with a server that manages content, in step S13, the right-holder terminal 1 notifies a server to distribute the contents data to the user terminal 2. The server distributes the content data to the user terminal 2 in accordance with an instruction received from the right-holder terminal 1.

In an embodiment of the present invention, the user terminal 2 registers, in the blockchain data B, the identifier of the user in the file management system 8, and transmits, to the right-holder terminal 1, the identifier of the user terminal 2 in the file management system 8 at the time of requesting permission for the content data. If the identifier of the user terminal 2 in the file management system 8 received when permission for the content data is requested by the user terminal 2 matches the identifier of the user terminal 2 in the file management system 8 acquired from the blockchain data B, the right-holder terminal 1 determines that the request is made from the valid user and, makes an instruction to distribute the content data to the user terminal 2.

Further, by registering, in the blockchain data B, a fact that the user has valid right when the user acquires the right to use the content data or the like, the right-holder terminal 1 may confirm that the user acquires the valid right to use the content data.

In the content usage system 10 according to an embodiment of the present invention, when digital content held by the file management system 8 is distributed, pieces of information on the right holder and the user are held in the blockchain data B. This enables the right holder and the user to verify validities each other via the blockchain data B. Further, by registering distribution, use, viewing/listening histories and the like of the content in the blockchain, the blockchain becomes possible to manage the respective histories of the content from a transaction history to distribution, use, and viewing/listening histories.

In the content usage system 10 according to an embodiment of the present invention, the file management system 8 operates according to instructions by the right-holder terminal 1 and the user terminal 2 based on information registered in the blockchain system 5. This limits the distribution of files by the file management system 8 and enables the proper distribution of the content. Further, the blockchain system 5 holds information on file right and does not need to hold the content data itself, and thus, the blockchain data B can be prevented from being bloated.

Next, first to fourth modified examples will be described with reference to FIGS. 5 to 9B.

First Modified Example

In the first modified example, a case is described in which the right-holder terminal 1 and the user terminal 2 do not directly authenticate each other, but authenticate each other after receiving authentications from the file management system 8. In the first modified example, communication among terminals such as the right-holder terminal 1 and the user terminal 2 may be encrypted.

Figure 5:
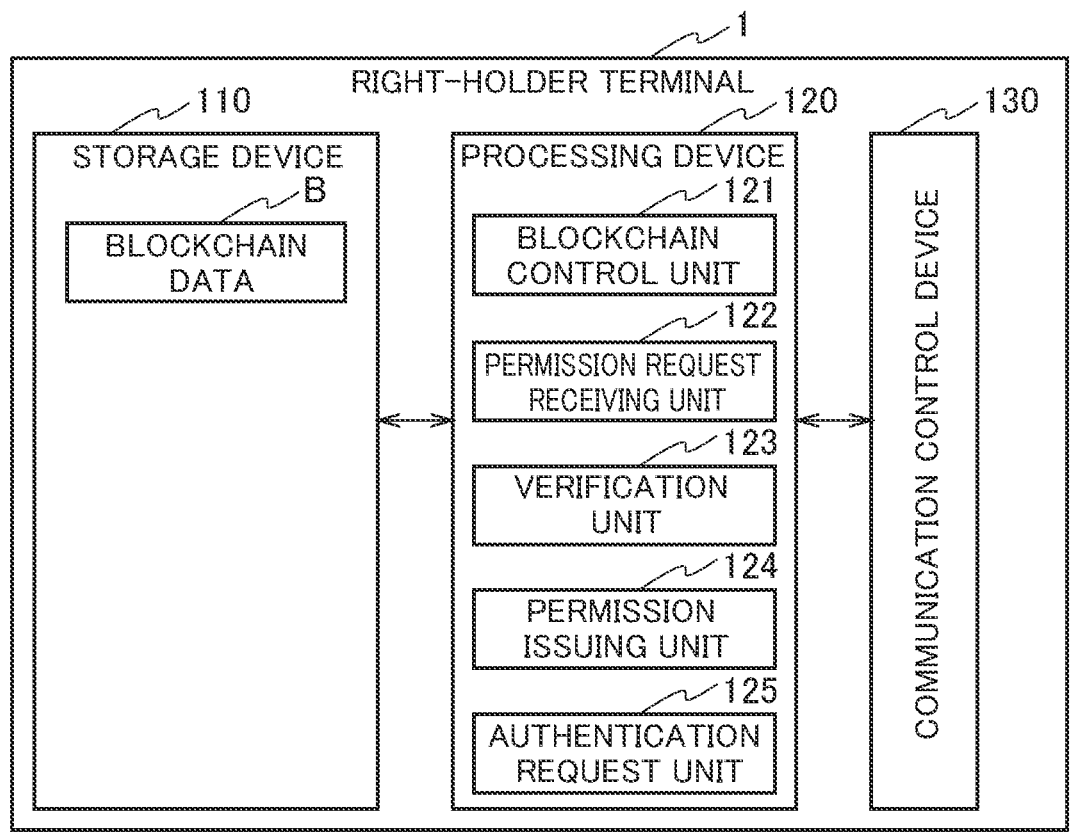
FIG. 5 is a diagram for explaining a hardware configuration and functional blocks of a right-holder terminal according to a first modified example.

As illustrated in FIG. 5, the processing device 120 of the right-holder terminal 1 according to the first modified example includes an authentication request unit 125. The authentication request unit 125 transmits a connection request to the file management system 8, and if the terminal is authenticated by the file management system 8, is connected to the file management system 8. The right-holder terminal 1 performs the processes illustrated in FIG. 4 after being connected to the file management system 8.

Figure 6:
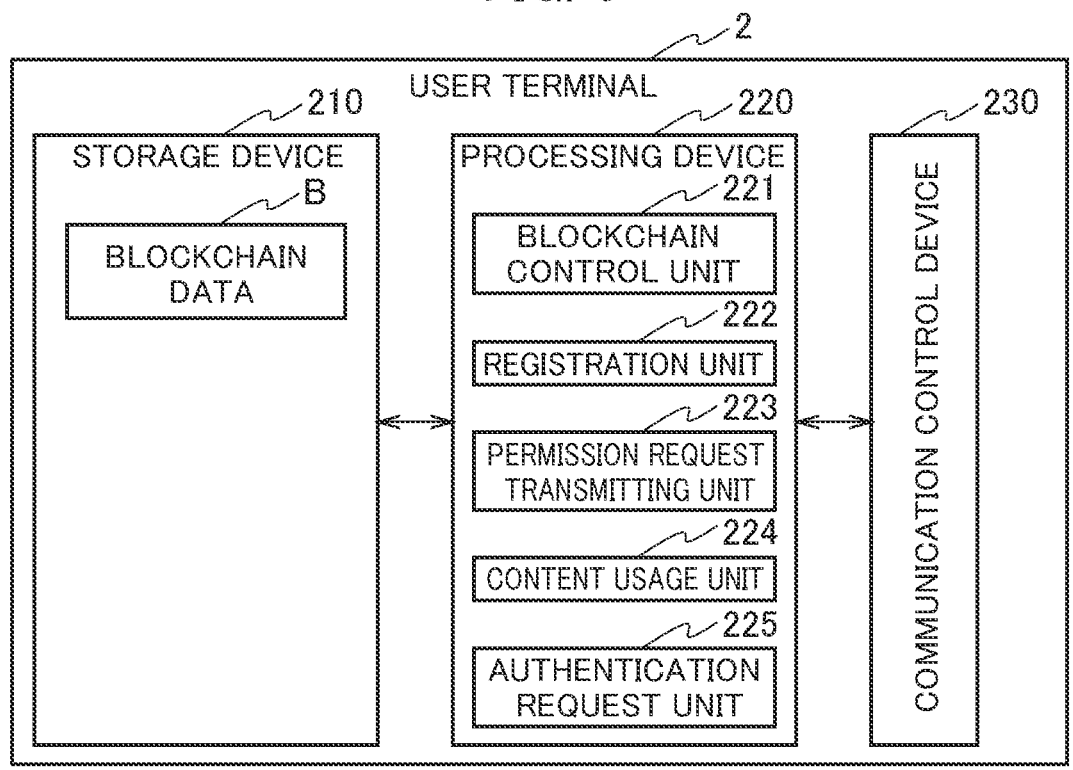
FIG. 6 is a diagram for explaining a hardware configuration and functional blocks of a user terminal according to a first modified example.

Similarly, as illustrated in FIG. 6, the processing device 220 of the user terminal 2 according to the first modified example includes an authentication request unit 225. The authentication request unit 225 transmits a connection request to the file management system 8, and if the terminal is authenticated by the file management system 8, is connected to the file management system 8. The user terminal 2 performs the processes illustrated in FIG. 4 after being connected to the file management system 8.

Second Modified Example

In the second modified example, the user terminal 2 registers, in the blockchain data B, the identifier of the user in the file management system 8, and transmits, to the right-holder terminal 1, an electronic signature acquired by electronically signing based on an electronic signature method in which a user public key can be restored.

The public key used in the second modified example is a user public key in the file management system 8. While it is possible to generate an identifier of the user from a user public key, it is not possible to generate the user public key from the identifier of the user. For example, a predetermined bit value of the user public key becomes the identifier of the user.

In the second modified example, functional blocks of the right-holder terminal 1 and the user terminal 2 are the same as those illustrated in FIGS. 2 and 3, but differ in the following points.

In the second modified example, the permission request receiving unit 122 of the right-holder terminal 1 receives, from the file management system 8, the permission request data for the content having the electronic signature of the user acquired by electronically signing based on the electronic signature method in which the user public key in the file management system 8 can be restored.

The verification unit 123 verifies that the identifier of the user corresponding to the user public key restored from the electronic signature corresponds to the identifier of the user registered in the blockchain data B. Further, the verification unit 123 confirms that the electronic signature is acquired by electronically signing a known message for the right-holder terminal 1 by using a secret key corresponding to the restored user public key.

In the second modified example, the registration unit 222 of the user terminal 2 registers, in the blockchain data B, the identifier of the user in the file management system 8. The registration unit 222 associates the identifier of the content to be used with the identifier of the user in the file management system 8 as the information on the valid user of the content, and registers the associated identifiers in blockchain data B.

The permission request transmitting unit 223 transmits the permission request data for the content having the electronic signature of the user acquired by electronically signing based on the electronic signature method in which the public key can be restored via the file management system 8. After the user electronically signs the known message for the right-holder terminal 1 by using the user secret key in the file management system 8, the permission request transmitting unit 223 transmits the known message.

If the right-holder terminal 1 verifies that the identifier of the user corresponding to the user public key restored from the electronic signature corresponds to (matches) the identifier of the user registered in the blockchain data B, the right-holder terminal 1 transmits permission data for permitting the use of the content by the user. Thereafter, by the permission data being transferred by the file management system 8, the content usage unit 224 receives, from the file management system 8, the permission data for permitting the use of the content by the user, and then, uses the content.

Examples of the electronic signature method in which the user public key can be restored include, for example, ECDSA (Elliptic Curve Digital Signature Algorithm). The electronic signature of the user is data acquired by the user terminal 2 electronically signing the known message for the right-holder terminal 1 based on the electronic signature method in which the user public key can be restored by using the user secret key.

With reference to FIG. 7, a content usage method according to a second modified example will be described. Hereinafter, descriptions will be given by focusing on the difference from the content usage method according to an embodiment of the present invention illustrated in FIG. 4.

Processes of steps S101 to S107 are the same as the processes of steps S1 to S7 in FIG. 4.

In step S108, the user terminal 2 transmits, to the file management system 8, the permission request data intended for the right-holder terminal 1. The permission request data includes the electronic signature of the user acquired by electronically signing based on the electronic signature method in which the user public key can be restored by using the user secret key in the file management system 8. In step S109, the file management system 8 transmits, to the right-holder terminal 1, the permission request data received from the user terminal 2.

Processes of steps S110 and S111 are the same as the processes of steps S10 and S11 in FIG. 4. In step S112, the right-holder terminal 1 confirms that the user is a valid right holder. Specifically, the right-holder terminal 1 confirms that the identifier of the user corresponding to the user public key restored from the electronic signature received in step S109 corresponds to (matches) the identifier of the user acquired from the blockchain data B in step S111.

If it is confirmed in step S112 that the permission request data is a request from a valid user, in step S113, the right-holder terminal 1 transmits the content data to the file management system 8. In step S114, the file management system 8 transmits the content data to the user terminal 2.

In the second modified example, the user terminal 2 registers, in the blockchain data B, the identifier of the user in the file management system 8, and transmits the electronic signature of the user acquired by electronically signing based on the electronic signature method in which the user public key in the file management system 8 can be restored at the time of requesting permission for the content. If the identifier of the user corresponding to the user public key restored from the electronic signature matches the identifier of the user registered in advance in the blockchain data B by the user, the right-holder terminal 1 determines that a request is from a valid user and makes an instruction to distribute the content data to the user terminal 2.

In the second modified example, if the identifier of the user in the file management system 8 is included in the permission request data transmitted from the user terminal 2, the right-holder terminal 1 may also verify that the user public key restored from the electronic signature corresponds to the identifier of the user included in the permission request data.

Third Modified Example

In a third modified example, the user terminal 2 registers, in the blockchain data B, the user public key in the file management system 8, and transmits, to the right-holder terminal 1, the electronic signature acquired by using the secret key corresponding to the user public key.

While it is possible to generate the identifier of the user from the user public key, it is not possible to generate the user public key from the identifier of the user. For example, a predetermined bit value of the user public key becomes the identifier of the user.

In the third modified example, functional blocks of the right-holder terminal 1 and the user terminal 2 are the same as those illustrated in FIGS. 2 and 3 except for the following points.

In the third modified example, the permission request receiving unit 122 of the right-holder terminal 1 receives, from the file management system 8, the permission request data for the content having the electronic signature of the user.

The verification unit 123 verifies that the user public key registered in the blockchain data B corresponds to the electronic signature. Specifically, the verification unit 123 confirms that the electronic signature is acquired by electronically signing the known message for the right-holder terminal 1 by using the secret key corresponding to the user public key.

In the third modified example, the registration unit 222 of the user terminal 2 registers, in the blockchain data B, the user public key in the file management system 8. The registration unit 222 associates the identifier of the content to be used with the user public key in the file management system 8 as the information on the valid user of the content, and registers the associated identifier and user public key in the blockchain data B.

The permission request transmitting unit 223 generates the electronic signature by using the user secret key in the file management system 8, and transmits the permission request data for the content having the electronic signature of the user via the file management system 8. The user secret key used for the generation of the electronic signature corresponds to the user public key registered in the blockchain data B.

If the right-holder terminal 1 verifies that the user public key registered in the blockchain data B corresponds to the electronic signature, the right-holder terminal 1 transmits the permission data for permitting the use of the content by the user. Thereafter, by the permission data being transferred by the file management system 8, the content usage unit 224 receives, from the file management system 8, the permission data for permitting the use of the content by the user, and then, uses the content.

A content usage method according to a third modified example will be described with reference to FIG. 8. Hereinafter, descriptions will be given by focusing on a difference from the content usage method according to an embodiment of the present invention illustrated in FIG. 4.

In step S201, the user terminal 2 transmits a transaction for registering, in the blockchain data B, the user public key in the file management system 8. The transaction is verified by the terminals that belong to the blockchain system 5 and is included in the blockchain data B. In step S202, the user public key included in the transaction is included in the blockchain data B. The blockchain data B including the user public key is synchronized among the terminals that belong to the blockchain system 5.

Processes of steps S203 to S207 are the same as the processes of steps S3 to S7 in FIG. 4.

In step S208, the user terminal 2 transmits, to the file management system 8, the permission request data intended for the right-holder terminal 1. The permission request data includes the electronic signature of the user acquired by electronically signing using the secret key corresponding to the user public key registered in the blockchain data B in the file management system 8. In step S209, the file management system 8 transmits, to the right-holder terminal 1, the permission request data received from the user terminal 2.

After receiving the permission request data, in step S210, the right-holder terminal 1 inquires about information on the user who has transmitted the permission request data to the blockchain data B. In step S211, the right-holder terminal 1 acquires the user public key from the blockchain data B as information on the user.

In step S212, the right-holder terminal 1 confirms that the user who has transmitted the permission request data received in step S209 is a valid user, and the permission request data is a request from the valid user. Specifically, the right-holder terminal 1 verifies that the user public key registered in the blockchain data B corresponds to the electronic signature. If the identifier of the user is included in the permission request data, the right-holder terminal 1 may confirm that the identifier of the user corresponds to the user public key registered in the blockchain data B. The right-holder terminal 1 may further refer to the blockchain data B to confirm that a predetermined amount of payment is made for the use of the content.

After confirming in step S212 that the permission request data is the request from the valid user, in step S213, the right-holder terminal 1 transmits content data to the file management system 8. In step S214, the file management system 8 transmits the content data to the user terminal 2.

In the third modified example, the user terminal 2 registers, in the blockchain data B, the user public key in the file management system 8, and transmits the electronic signature of the user acquired by electronically signing using the secret key corresponding to the user public key in the file management system 8 at the time of requesting permission for the content. If the user public key registered in the blockchain data B corresponds to the electronic signature, the right-holder terminal 1 determines that the request is from the valid user, and makes an instruction to distribute the content data to the user terminal 2.

In the third modified example, if the identifier of the user in the file management system 8 is included in the permission request data transmitted from the user terminal 2, the right-holder terminal 1 may also verify that the user public key registered in the blockchain data B corresponds to the identifier of the user included in the permission request data.

Fourth Modified Example

In a fourth modified example, the user terminal 2 registers, in the blockchain data B, the identifier of the user in the file management system 8, associates the user public key in the file management system 8 with the identifier of the user, and registers the associated user public key and identifier in the file management system 8. The user terminal 2 transmits, to the right-holder terminal 1, the electronic signature acquired by using the secret key corresponding to the user public key registered in the file management system 8.

While it is possible to generate the identifier of the user from the user public key, it is not possible to generate the user public key from the identifier of the user. For example, a predetermined bit value of the user public key becomes the identifier of the user.

In the fourth modified example, functional blocks of the right-holder terminal 1 and the user terminal 2 are the same as those illustrated in FIGS. 2 and 3 except for the following points.

In the fourth modified example, the permission request receiving unit 122 of the right-holder terminal 1 receives, from the file management system 8, the permission request data for the content including the identifier of the user and the electronic signature of the user.

The verification unit 123 acquires, from the file management system 8, the public key corresponding to the identifier of the user included in the permission request data, and verifies that the acquired public key corresponds to the electronic signature, and that the identifier of the user included in the permission request data corresponds to the identifier of the user registered in the blockchain data B. The verification unit 123 confirms that the electronic signature is data acquired by electronically signing the known message for the right-holder terminal 1 using the secret key corresponding to the user public key. The verification unit 123 further verifies that the public key acquired from the file management system 8 corresponds to the identifier of the user registered in the blockchain data B, specifically verifies that a predetermined bit value of the public key becomes the identifier of the user.

In the fourth modified example, the registration unit 222 of the user terminal 2 registers, in the blockchain data B, the identifier of the user in the file management system 8, associates the identifier of the user in the file management system 8 with the public key, and registers, in the file management system 8, the associated identifier and public key. The registration unit 222 associates the identifier of content to be used with the identifier of the user in the file management system 8 as information on the valid user of the content and registers the associated identifiers in blockchain data B.

The permission request transmitting unit 223 generates the electronic signature by using the secret key corresponding to the user public key registered in the file management system 8, and transmits the permission request data for the content including the identifier of the user and the electronic signature of the user via the file management system 8.

The right-holder terminal 1 acquires, from the file management system 8, the public key corresponding to the identifier of the user included in the permission request data. In the right-holder terminal 1, if it is verified that the acquired public key corresponds to the electronic signature, and that the identifier of the user included in the permission request data corresponds to the identifier of the user registered in the blockchain data B, the permission data for permitting the use of the content by the user is transmitted. Thereafter, by the permission data being transferred by the file management system 8, the content usage unit 224 receives, from the file management system 8, the permission data for permitting the use of the content by the user, and uses the content.

Figure 9A:
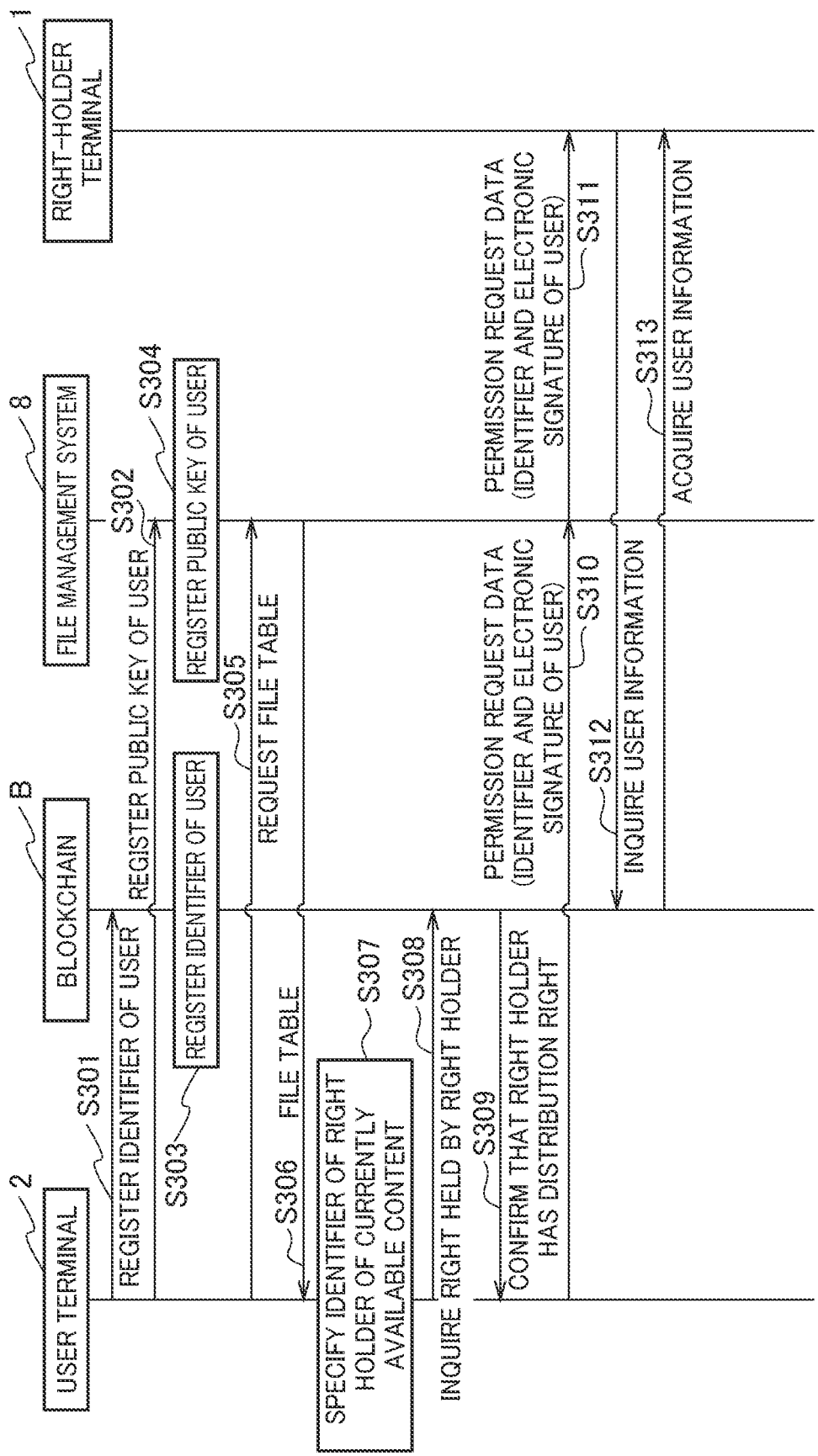
FIG. 9A is a sequence diagram for explaining a content usage method according to a fourth modified example (Part 1).
Figure 9B:
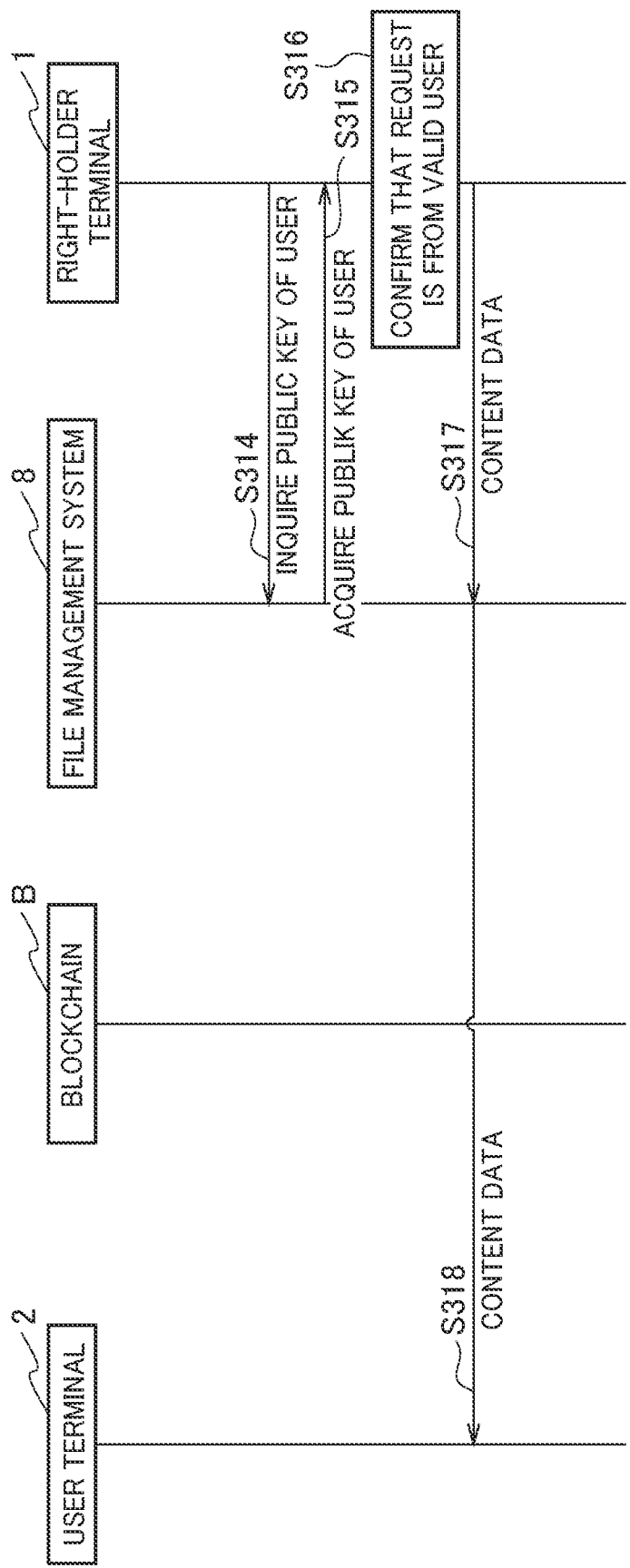
FIG. 9B is a sequence diagram for explaining a content usage method according to a fourth modified example (Part 2).

With reference to FIGS. 9A and 9B, a content usage method according to the fourth modified example will be described. Descriptions will be given by focusing on a difference from the content usage method according to an embodiment of the present invention illustrated in FIG. 4.

First, in step S301, the user terminal 2 transmits a transaction for registering, in the blockchain data B, the identifier of the user in the file management system 8. The transaction is verified by the terminals that belong to the blockchain system 5 and is included in the blockchain data B. In step S303, the identifier of the user included in the transaction is included in the blockchain data B. The blockchain data B including the identifier of the user is synchronized among the terminals that belong to the blockchain system 5.

In step S302, the user terminal 2 associates the user public key in the file management system 8 with the identifier of the user, and registers the associated user public key and identifier in the file management system 8.

In step S304, the user public key is registered in the file management system 8.

Processes of steps S305 to S309 are the same as the processes of steps S3 to S7 in FIG. 4.

In step S310, the user terminal 2 transmits, to the file management system 8, the permission request data intended for the right-holder terminal 1. The permission request data includes the identifier of the user in the file management system 8 and the electronic signature of the user acquired by electronically signing using the user secret key in the file management system 8. In step S311, the file management system 8 transmits, to the right-holder terminal 1, the permission request data received from the user terminal 2.

Processes of steps S312 and S313 are the same as the processes of steps S10 and S11 in FIG. 4.

In step S314, the right-holder terminal 1 inquires about the public key corresponding to the identifier of the user acquired in step S311 to the file management system 8, and acquires the user public key in step S315.

In step S316, the right-holder terminal 1 confirms that the user is a valid right holder. Specifically, the right-holder terminal 1 confirms that the user public key acquired from the file management system 8 corresponds to the electronic signature acquired in step S311, and further confirms that the identifier of the user included in the permission request data matches the identifier of the user registered in the blockchain data B.

After confirming in step S316 that the permission request data is a request from the valid user, in step S317, the right-holder terminal 1 transmits content data to the file management system 8. In step S318, the file management system 8 transmits the content data to the user terminal 2.

In the fourth modified example, the user terminal 2 registers, in the blockchain data B, the identifier of the user in the file management system 8, and registers, in the file management system 8, the user public key in the file management system 8. The user terminal 2 transmits the electronic signature of the user acquired by electronically signing using the secret key corresponding to the user public key registered in the file management system 8 at the time of requesting permission for the contents. If the public key acquired from the file management system 8 corresponds to the electronic signature and also if the identifier of the user included in the permission request data corresponds to (matches) the identifier of the user registered in the blockchain data B, the right-holder terminal 1 determines that the request is from the valid user, and makes an instruction to distribute the content data to the user terminal 2.

Another Embodiment

As described above, the present invention has been described by using an embodiment and the first to fourth modified examples of the present invention, but the discussion and drawings forming part of the disclosure should not be construed as limiting the present invention. Various alternative embodiments, example, and operational techniques will be apparent to those skilled in the art from this disclosure.

For example, the right-holder terminal described in an embodiment of the present invention may be constituted on a single piece of hardware as illustrated in FIG. 2, or alternatively may be constituted on a plurality of pieces of hardware depending on functions and the number of processes.

The order of the processes described with reference to sequence diagrams is merely an example, and the present invention is not limited to the described order.

It is needless to say that the present invention encompasses various embodiments and the like which are not described herein. Therefore, the technical scope of the present invention is determined only by the matters specifying the invention according to the claims which are reasonable from the above description.

EXPLANATION OF THE REFERENCE NUMERALS

1 Right-holder terminal
2 User terminal
3 Blockchain control terminal
4 Blockchain network
5 Blockchain system
6 File management control terminal
7 File management network
8 File management system
10 Content usage system
110, 210 Storage device
120, 220 Processing device
121, 221 Blockchain control unit
122 Permission request receiving unit
123 Verification unit
124 Permission issuing unit
130, 230 Communication control device
222 Registration unit
223 Permission request transmitting unit
224 Content usage unit
B Blockchain data

The invention claimed is:

1. A right-holder terminal configured to be used by a right holder of content and to transmit permission data for the content to a user of the content, wherein
   data of the content is registered in a file management system; and
   an identifier of the user in the file management system is registered in a distributed ledger, in association with an identifier of the content, as a valid user of the content;
the right-holder terminal comprising:
   a permission request receiving unit, including one or more processors, configured to receive, from the file management system, permission request data for the content including the identifier of the user;
   a verification unit, including one or more processors, configured to verify that the identifier of the user registered in the distributed ledger as a valid user of the content corresponds to the identifier of the user included in the permission request data; and
   a permission issuing unit, including one or more processors, configured to transmit, to the file management system, the permission data for permitting use of the content by the user.

2. The right-holder terminal according to claim 1, further comprising:
   an authentication request unit, including one or more processors, configured to transmit a connection request to the file management system and establish connection to the file management system if the connection request is authenticated by the file management system.

3. A user terminal configured to be used by a user of content and to transmit permission request data for the content to a right holder of the content, wherein
  data of the content is registered in a file management system;
the user terminal comprising:
  a registration unit, including one or more processors, configured to register, in a distributed ledger, an identifier of the user in the file management system as a valid user of the content, wherein the identifier of the user is registered in association with an identifier of the content in the distributed ledger;
  a permission request transmitting unit, including one or more processors, configured to transmit the permission request data for the content including the identifier of the user via the file management system; and
  a content usage unit, including one or more processors, configured to receive, from the file management system, permission data for permitting a use of the content by the user and use the content, if it is verified in a terminal of the right holder that the identifier of the user registered in the distributed ledger as a valid user of the content corresponds to the identifier of the user included in the permission request data.

4. The user terminal according to claim 3, further comprising: an authentication request unit, including one or more processors, configured to transmit a connection request to the file management system and establish connection to the file management system if the connection request is authenticated by the file management system.

5. A content usage method used for a content usage system comprising a right-holder terminal that is used by a right holder of the content and transmits permission data for the content to a user of the content, and a user terminal that is used by the user of the content and transmits permission request data for the content to the right holder of the content, wherein
  data of the content is registered in a file management system;
the content usage method comprising:
  registering, by the user terminal, in a distributed ledger, an identifier of the user in the file management system as a valid user of the content, wherein the identifier of the user is registered in association with an identifier of the content in the distributed ledger;
  transmitting, by the user terminal, the permission request data for the content including the identifier of the user via the file management system;
  receiving, by the right-holder terminal, from the file management system, the permission request data for the content including the identifier of the user;
  verifying, by the right-holder terminal, that the identifier of the user registered in the distributed ledger as a valid user of the content corresponds to the identifier of the user included in the permission request data;
  transmitting, by the right-holder terminal, to the file management system, the permission data for permitting a use of the content by the user; and
receiving, by the user terminal, the permission data from the file management system and using the content.

6. The content usage method according to claim 5 further comprising: transmitting a connection request to the file management system and establishing connection to the file management system if the connection request is authenticated by the file management system.

* * * * *